Jan. 13, 1942.  E. L. GAYHART  2,269,453
DEVICE FOR DETECTING DISPLACEMENTS
Filed Jan. 12, 1938  3 Sheets-Sheet 1
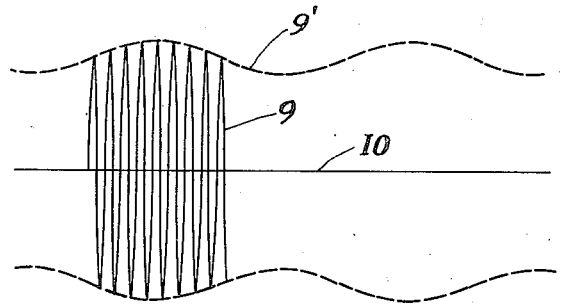
Fig. I.
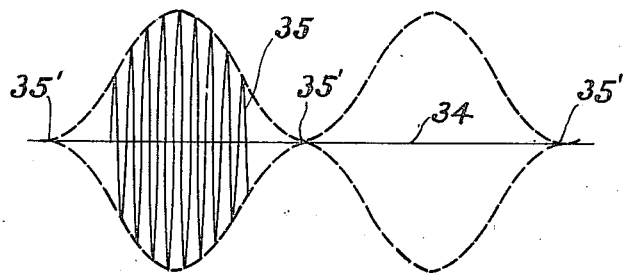
Fig. 2.
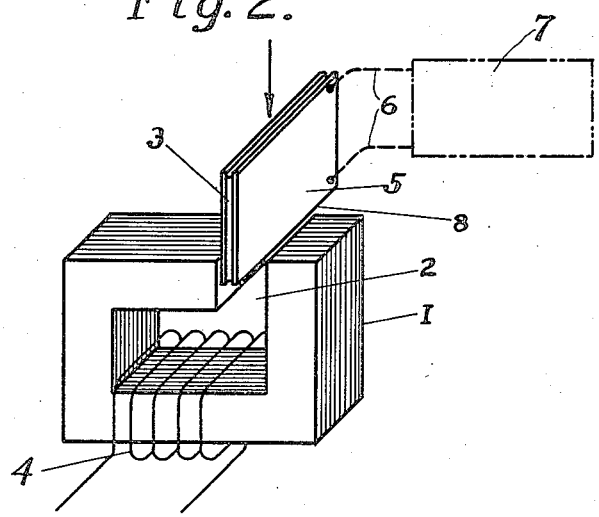
Fig. 3.
INVENTOR
Everett L. Gayhart Jan. 13, 1942.  E. L. GAYHART  2,269,453
DEVICE FOR DETECTING DISPLACEMENTS
Filed Jan. 12, 1938  3 Sheets-Sheet 2
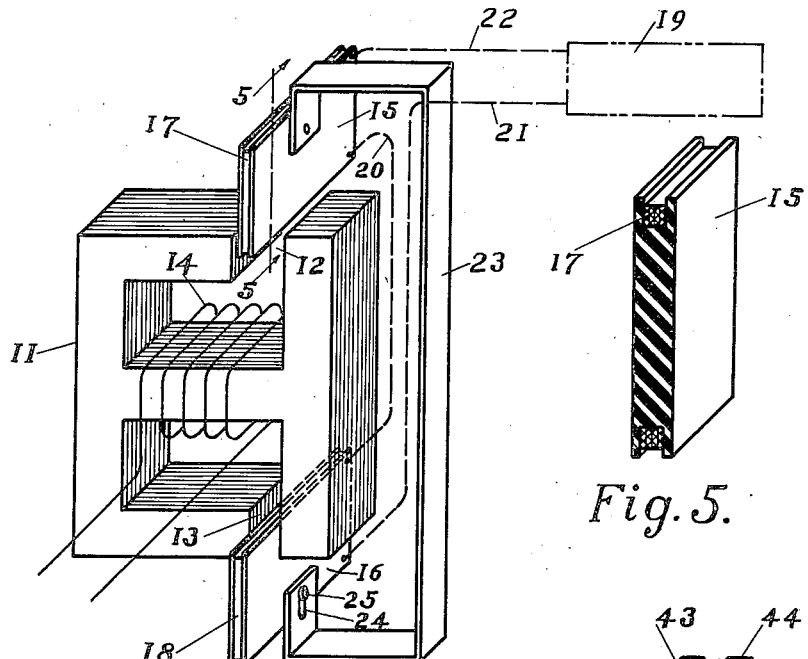
Fig. 4.
Fig. 5.
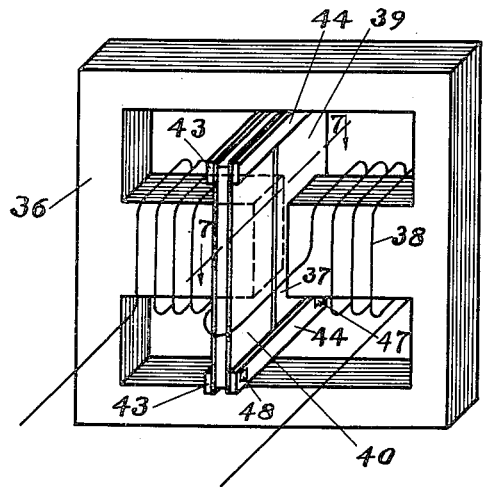
Fig. 6.
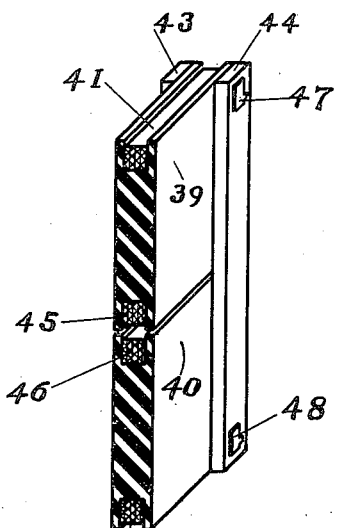
Fig. 7.
INVENTOR
Everett L. Gayhart
BY
ATTORNEY Jan. 13, 1942.  E. L. GAYHART  2,269,453
DEVICE FOR DETECTING DISPLACEMENTS
Filed Jan. 12, 1938  3 Sheets-Sheet 3
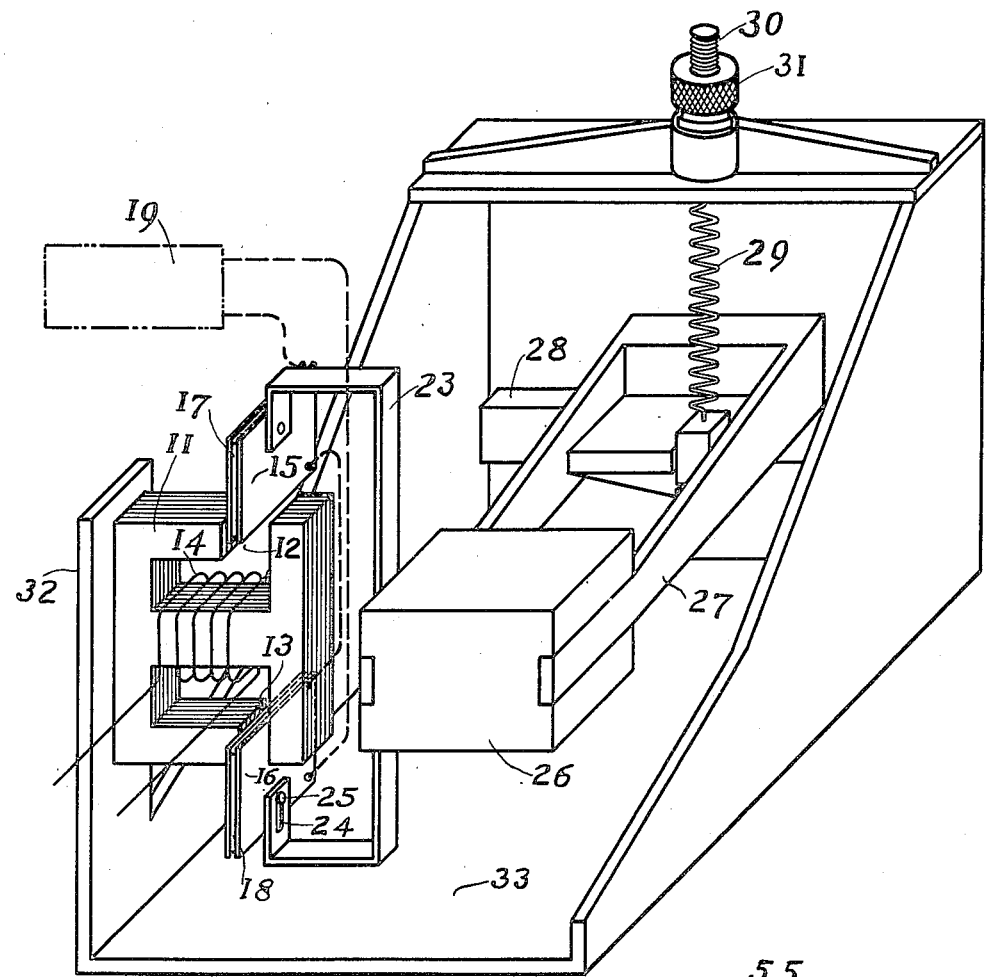
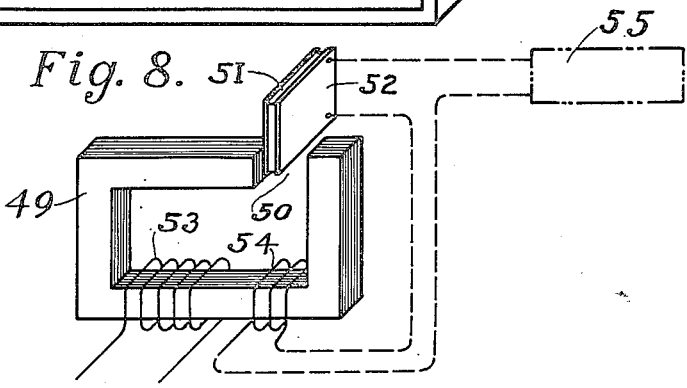
Fig. 8.
Fig. 9.
INVENTOR
Everett L. Gayhart
BY
ATTORNEY

UNITED STATES PATENT OFFICE 2,269,453

DEVICE FOR DETECTING DISPLACEMENTS

Everett L. Gayhart, United States Navy

Application January 12, 1938, Serial No. 184,591

2 Claims. (Cl. 177—352)

(Granted under the act of March 3, 1883, as amended April 30, 1928; 370 O. G. 757)

My invention relates to a device for detecting displacements and more particularly to a simple, rugged and effective electrical apparatus for the remote and substantially instantaneous detection or measurement of mechanical displacements which may be either large or small in magnitude. The device of my invention operates on the principle of electromagnetic induction and is of marked utility in those fields where it becomes necessary to measure or detect small displacements whether periodic or non-periodic in nature.

In one type of device known to the prior art for detecting or measuring displacements which operates on the principle of electromagnetic induction, a winding responsive to the displacement to be detected is inductively mounted for movement in a constant electromagnetic field. In consequence of this arrangement the magnitude of any electromotive force induced in the aforesaid winding is proportional, not to the displacement under detection, but to the instantaneous velocity of movement of the winding, which is, of course, the first derivative of the displacement with respect to time. Hence, any of the usual indicating devices connected in circuit with the said winding will not yield a displacement curve. If such a curve is to be obtained, the curve which is the first derivative of the displacement with respect to time must be integrated either by mathematical methods or by the employment of an accessory integrating circuit. Any mathematical method that can be employed is tedious and does not always yield accurate results; while the integrating circuit gives accurate results only under favorable conditions. The prior art device here under discussion possesses a further disadvantage when seeking to measure or detect a low frequency periodic displacement of small magnitude, in that the well known prior art alternating current amplifiers do not have such characteristics that they can be employed therewith to increase the sensitivity. As a result, recourse must be had to the so-called direct current amplifier. This type of amplifier is difficult to construct, requires an inordinate provision of plate and bias voltage and is unstable in operation. It is thus seen that if a winding responsive to a displacement to be detected and inductively mounted for movement in a constant electromagnetic field is to be employed in the investigation of both the amplitude and frequency of a periodic displacement, that the ensuing apparatus must necessarily be complex and of doubtful accuracy.

With a view to obviating the foregoing prior art deficiencies, I utilize in place of the prior art constant electromagnetic field a varying or alternating electromagnetic field of any convenient frequency in at least a part of which at any instant there is a substantially uniform flux distribution. In the broadest aspect of the invention a winding responsive to the displacement to be detected has a portion thereof inductively associated at all times with that part of the varying electromagnetic field wherein at any instant there is a substantially uniform flux distribution and the remaining portion thereof in substantially non-inductive relation with the said field. Any movement imparted to the winding is substantially translatory in character and is in a direction substantially normal to that portion of the winding which is at all times in the uniform part of the varying electromagnetic field. Furthermore, that portion of the winding which is inductively associated at all times with the uniform part of the varying electromagnetic field is preferably, although not necessarily, substantially medially positioned in this part of the field under normal and non-detecting conditions so that the aforesaid portion of the winding is capable of excursions to both sides of this medial position attending the measurement or detection of any displacement.

The voltage induced in any winding depends merely upon the number of turns in the winding and the time rate of change of flux through it. If $\phi_0$ is the maximum value of the total flux within the varying electromagnetic field and it is assumed for purposes of exposition only that this flux has a sinusoidal variation then the total flux in the field is at any instant represented by the equation $$\phi = \phi_0 \sin \omega t \tag{1}$$

If the number of turns in the winding is denoted by N then the voltage induced in the winding at any instant by the flux $\phi$ if the winding links all flux within the field is $$e = -N \frac{d\phi}{dt} \tag{2}$$

This latter equation reduces by substitution therein for the derivative to $$e = -\omega N \phi_0 \cos \omega t \tag{3}$$

Therefore, the maximum voltage induced in the winding, if it is assumed that it links all flux within the field is $$e_m = 2\pi f N \phi_0 \tag{4}$$

From Equation 4 it is at once evident that if the frequency of the varying magnetic field and the turns of the winding are constant that the amplitude or magnitude of the induced electromotive force will be a function of that fraction of $\phi_0$ linked with the winding, where $\phi_0$ is the maximum value of the total flux within the varying electromagnetic field.

The device of my invention makes use of the principles set forth in the preceding paragraph in that that portion of the winding within the uniform field is compelled to take a position removed from its medial orientation dependent upon the magnitude of the displacement under detection. Since each position of the winding portion corresponds to a definite but different fraction of $\phi_0$ linking with the winding a different voltage will be induced in the winding for each position thereof. Furthermore, since the non-detecting position of the winding portion is preferably in the medial part of the uniform field, it follows that movement of the winding in one direction will increase the fraction of $\phi_0$ linking therewith, thus increasing the magnitude or amplitude of the induced voltage over that obtaining at the medial position, while movement of the winding in an opposite direction will conversely decrease the fraction of $\phi_0$ linking with the winding with attendant diminution in the magnitude of the alternating voltage induced at the medial position. Finally, and of great importance, any incremental change in the induced alternating electromotive force attending the detection or measurement of a displacement will be directly proportional to the displacement, since the portion of the winding associated with the varying electromagnetic field moves only in that part thereof wherein at any instant there is a substantially uniform flux distribution. Thus, in the device of my invention there is established a linear relationship between the displacement under detection and the magnitude or amplitude of the induced electromotive force which greatly facilitates and simplifies the calibration of any indicating device connected in circuit with the movable winding and at the same time renders any indication highly intelligible.

Thus the device of my invention makes possible a direct determination of the displacement curve attending the measurement or detection of a displacement since the incremental changes in the amplitude of the induced electromotive force are functions only of the instantaneous position of the movable winding and not of its velocity of movement. This statement holds for non-periodic displacement as well as for periodic displacements within a substantial range of frequencies. The qualifications imposed upon this statement by reason of high velocity movements of the detecting winding will be discussed herein subsequently. Furthermore, the device of my invention lends itself very readily to the detection or measurement of small displacements since the output of the detecting winding can be conveniently amplified in contradistinction to the difficulties encountered in the prior art devices. Thus, in the present improvement the amplifier need only be designed to amplify at the frequency of the varying electromagnetic field which is a constant for any one use of my device and may be chosen at will. If the frequency of the varying electromagnetic field is within the range of audio frequencies any of the well known prior art audio amplifiers may be employed provided the amplification is linear in character. With such an amplifier the variation in the output will correspond to changes in position of the winding responsive to the displacement to be detected irrespective of whether the winding is moved slowly or rapidly.

The device of my invention is capable of detecting or measuring periodic or non-periodic displacements of either large or small magnitude and because of its simplicity, ruggedness, practicability and extreme sensitivity has a wide field of application. As illustrative of its many uses it may be employed for detecting or measuring mechanical or elastic vibrations such as occur in bridges, buildings, various machinery and other structures; for detecting or recording seismic disturbances, either natural or such as are produced as incidental to geo-physical exploration; and for detecting or measuring elastic deformation wherein the device can conveniently be used as the sensitive element of a strain gauge.

In the light of the foregoing it is among the several objects of my invention to provide a device operating on the principle of electromagnetic induction for detecting or measuring a displacement, the indication of which is proportional to the magnitude of the displacement and not to the time rate change of displacement; to provide a device of the stated character wherein the movable winding responsive to the displacement to be detected has a portion thereof at all times associated with that part of a varying electromagnetic field wherein at any instant there is a substantially uniform flux distribution; and finally, to provide a device of the aforesaid character wherein the sensitivity is greatly enhanced by employing a plurality of conjointly movable windings connected in series opposition.

Other objects and many of the attendant advantages of this invention will be readily appreciated as the same becomes better understood by reference to the following detailed description when considered in connection with the accompanying sheets of drawings wherein:

Fig. 1 is a representation of an oscillograph record showing the variation of the induced voltage in a single winding of the embodiment of Fig. 3 attending its vibrational movement about a medial position within the air gap in response to a periodic displacement;

Fig. 2 is a representation of an oscillograph record showing the variation of the resultant of the electromotive forces induced in the conjointly movable windings depicted in the embodiments of Figs. 4 and 6 when the windings are subjected to a vibrational movement in response to a periodic displacement about a position at which the induced voltages annul each other;

Fig. 3 depicts the device of the present invention in its simplest form and wherein a single winding is associated with the varying electromagnetic field within a gap of a magnetic circuit;

Fig. 4 discloses an alternative embodiment of the invention for increasing the sensitivity of the indication and wherein a plurality of windings connected in series opposition is employed for conjoint movement, each of said windings being associated with a separate gap of the magnetic circuit in which the varying electromagnetic field is generated by a common exciting winding;

Fig. 5 is a sectional view taken on the line 5—5 of Fig. 4 showing one of the windings in greater detail and the mode of supporting the same on its carrying member;

Fig. 6 discloses a further embodiment of the invention for increasing the sensitivity of the indication and wherein a plurality of windings connected in series opposition is employed for conjoint movement, each of said windings being associated with a single gap of the magnetic circuit in which the varying electromagnetic field is generated by an exciting winding;

Fig. 7 is a sectional view taken on the line 7—7 of Fig. 6 showing in greater detail the two windings, the manner of supporting the same on their respective carrying members and the mode of securing the two carrying members for conjoint movement;

Fig. 8 shows the embodiment of Fig. 4 as applied to a well known prior art, vertical motion seismograph, which is designed to record the vertical component of the seismic disturbances; and Fig. 9 depicts a still further embodiment of the present invention wherein a compensating winding inductively coupled with the magnetic circuit is connected in series opposition with the movable winding so that the induced electromotive forces will annul each other in a predetermined position of the movable coil to give an oscillograph record similar to that of Fig. 2 when similarly detecting but without enhanced sensitivity.

Before proceeding with a detailed description of the invention, it is essential, in the interest of clarity, that certain general remarks applicable to all embodiments and concerning the magnetic circuit, winding and indicating device associated therewith, be made.

The magnetic circuit, as pointed out hereinbefore, is designed to provide a varying electromagnetic field in at least a part of which at any instant there is a substantially uniform flux distribution. It is a matter of common knowledge in electromagnetism that the flux distribution in a magnetic field depends upon the shape of the exciting coils and upon the nature, shape and position of the iron or other ferro-magnetic material in the magnetic circuit. Hence, those skilled in the art will readily perceive many arrangements which will provide the required flux distribution of the present invention. In the various embodiments in the drawings, however, I have shown the magnetic circuit for illustrative purposes as consisting of a laminated member of iron or other ferro-magnetic material and provided with one or more gaps. Each of these members is excited by a suitable winding carrying an alternating current to thus set up a varying electromagnetic field within the member and gap or gaps. In each of the embodiments the shape of the exciting coil and the nature, shape and position of the iron or other ferro-magnetic material in the magnetic circuit is to be understood as being such as to provide within the air gap or gaps a varying electromagnetic field in a substantial part of which there is at any instant a substantially uniform flux distribution.

The detecting winding or windings are so shaped or so placed with respect to the air gap or gaps that the change of flux linkages with the substantially uniform magnetic field is directly proportional to the displacement of the winding from an initial point of excursion. In consequence thereof, as stated hereinbefore, the incremental changes in the induced electromotive forces are likewise directly proportional to the changes in displacement. This condition of proportionality is most easily attained by so shaping the detecting winding that the side thereof lying within the air gap presents, although not necessarily, a linear configuration with any movement of the winding substantially translatory in character and in a direction substantially normal to the aforesaid winding side. The remaining portion of the winding may be of any shape, provided it is entirely, or for practical purposes, beyond the lines of the fringing flux at the air gap. The winding may be most conveniently shaped as a square or rectangle, as shown in the drawings. This showing is only for purposes of illustration and it is to be expressly understood that I do not desire to be restricted thereto. If the winding does have a rectangular configuration, the active side within the air gap will be perpendicular to the line of motion; the end sides will lie in the line of motion; and the fourth and remaining side will be most remote from the flux in the air gap.

For indicating or measuring the detected displacement some form of current or voltage indicating device must be operatively associated with the detecting winding or windings. As suggestive but not restrictive of such indicating devices there may be advantageously employed a cathode ray oscillograph, an oscillograph of the vibrating mirror type, an alternating current ammeter or voltmeter, or a rectifying circuit with a direct current ammeter or voltmeter. It is desirable that the indicating device be so sensitive as to require but negligible current for its operation, since otherwise the current drawn by the indicating device will set up a field in the detecting winding which will react with the field in the air gap and impair the strict proportionality between the induced voltage and displacement heretofore referred to. While many types of indicating devices satisfy this requirement, the cathode ray oscillograph and the input circuit of a vacuum tube amplifier are outstanding examples of devices possessing the recited characteristics.

Turning now to the drawings, there is shown depicted in Fig. 3 thereof the simplest form which the device of the present invention may assume. The magnetic circuit is shown as consisting of a laminated member I of any suitable ferro-magnetic material provided with a gap 2 in which a portion of the detecting winding 3 is mounted for movement. An exciting coil 4 energizable by any suitable source of alternating electromotive force of convenient frequency is shown as encircling a part of the member I to thus set up when energized an alternating magnetic flux within the member I and the gap 2. The magnetic circuit comprised of the ferromagnetic member I and the coil 4 associated therewith is designed in such a manner that a substantial part of the varying electromagnetic field within the gap 2 will have at any instant a substantially uniform flux distribution.

The winding 3 which is responsive to any displacement to be detected may have any desired number of turns and is conveniently wound within a peripheral groove of the carrying member 5 which, for illustrative purposes, is shown as having a rectangular configuration. The winding 3 is electrically connected by the conductors 6 to a suitable indicating device 7 which may, for example, be a cathode ray oscillograph. As indicating one type of cathode ray oscillograph which may conveniently be employed reference is made to the disclosure of the device shown and described on pages 421 to 424 of the text entitled "Modern Physics," by G. E. M. Jauncey, 2nd edition, June, 1937, published by D. Van Nostrand Company, Inc. of New York.

The winding 3 is shown positioned with respect to the magnetic circuit such that the side 8 thereof is at all times inductively coupled with the uniform magnetic field in the air gap 2 and for this purpose is preferably, although not necessarily, medially positioned within the gap. This preferred orientation of the side 8 of the winding 3 makes possible excursions of the same to both sides of the medial position while yet insuring a continuous inductive coupling of the winding 8 with the uniform magnetic field. The remaining sides of the winding 3 are positioned in substantially non-inductive relation with respect to the varying electromagnetic field. Any movement imparted to the carrying member 5 attending the detection of a displacement is substantially translatory in character.

If now, the carrying member 5 is secured to an object under investigation, the vibratory motion of which is substantially parallel to the plane of the air gap 2 and of regular periodicity, there will appear upon the screen of the cathode ray oscillograph 7 a wave envelope such as is shown in Fig. 1 of the drawings. It is, of course, essential that the sweep circuit of the cathode ray oscillograph which serves the function of fixing a time axis be adjusted to the frequency of the vibration under observation or some multiple thereof. The fluorescent moving spot of cathode ray impingement on the oscillograph screen will described a wave 9 at the frequency of the source energizing the exciting coil 4, the instantaneous amplitude of which is determined by the instantaneous position of the winding 3 to thus produce the boundary or envelope 9'. The vertical distance measured on the screen from crest to hollow of the envelope 9', assuming the time axis 10 to be horizontal, will represent the amount of change in position of the detecting winding 3. The horizontal distance from crest to crest measured by the time scale will give the period of the vibration. In order that the boundary or envelope 9' of Fig. 1 may be traced with satisfactory precision, it is desirable that the frequency of the source energizing the exciting coil 4 be considerably higher than the frequency of the vibratory phenomenon under observation. As illustrating a ratio of frequencies that may be advantageously employed, a ratio of 10 to 1 is suggested. The choice of frequency, therefore, of the source for energizing the coil 4 is thus in a manner dependent upon the character of the displacement under observation. For studying certain vibratory displacements, frequencies somewhere in the range between 60 cycles, which is readily available commercially, and 2000 cycles which is a practical upper limit for the vibrating mirror oscillograph, have been conveniently employed.

In order that the change in induced electromotive force may be proportional to the change in displacement, it is necessary that the change in flux be proportional to the change in displacement, a condition which can only be realized when the inductively coupled side of the movable winding traverses that part of the varying electromagnetic field within the air gap wherein at any instant there is a substantially uniform flux distribution. This requires that the initial position of the inductively coupled side of the winding be well within the pole faces and beyond the influence of any fringing as described in connection with the embodiment depicted in Fig. 3 of the drawings. In consequence of the positioning of the inductively coupled side of the winding a considerable initial electromotive force is induced in the winding in its non-detecting position from which any displacement is measured. Any change in the magnitude of this electromotive force induced at the non-detecting position of the winding attending the measurement of a displacement may be comparatively small. In order, therefore, to increase the relative change of electromotive force with displacement I propose as a variation to employ a plurality of windings mounted either in the same gap or in a plurality of cooperating gaps of the magnetic circuit, these windings being adapted for conjoint movement attending the detection or measurement of a displacement. Since the windings are connected in series opposition, the indicating device is responsive only to the resultant of their induced electromotive forces and therefore insures an enhanced sensitivity of the device.

Turning now to Figs. 4 and 5 of the drawings, there is shown disclosed therein the magnetic circuit including the laminated ferro-magnetic member 11 provided with a plurality of gaps 12 and 13. A coil 14 energized by a source of alternating electromotive force of any suitable frequency serves to set up a varying electromagnetic field within the member 11 and the gaps 12 and 13, the field in the gaps having a substantial part thereof that is uniform. While I have shown a unitary member 11 provided with a plurality of gaps, I do not desire to be restricted thereto, since a separate magnetic circuit could be provided for each gap provided the two circuits are excited by a common frequency.

Rectangular members 15 and 16 carry windings 17 and 18 which may have any convenient number of turns. One method of winding the turns on the carrying member is clearly depicted in Fig. 5 of the drawings where the carrying member 15 is shown peripherally grooved to receive the turns of the winding 17. The windings 17 and 18 are connected in series opposition and to a suitable indicating device 19, such as a cathode ray oscillograph, by means of the conductors 20, 21 and 22.

In order to provide for conjoint movement of the members 15 and 16 and the windings carried thereby, these members are suitably secured together by means of the cross piece 23 in the manner shown in the drawings. The members 15 and 16 are made relatively adjustable by providing the lower portion of the cross piece 23 with a slot 24 and an adjustable securing means 25 for cooperation with the slot and member 16. Thus, it is possible to adjust the winding 18 with respect to the winding 17 in their non-detecting positions such that the electromotive forces induced within the respective windings will annul each other. It should be carefully noted that the windings 17 and 18 are mechanically connected by the cross piece 23 in such a fashion that any displacement from the position wherein the induced electromotive forces annul each other increases the flux linkages in one of the windings while simultaneously decreasing the flux linkages in the remaining winding, with the consequence that any change in the resultant of the induced electromotive forces is double that produced by the same displacement of a single winding such as is shown in Fig. 3 of the drawings. Thus, the sensitivity of detection is measurably enhanced.

A practical application of the embodiment depicted in Fig. 4 of the drawings is shown in Fig. 8 thereof where the device is operatively associated with a well known prior art vertical motion seismograph, which is an instrument designed to record the vertical component of the seismic disturbance. The cross piece 23 is shown attached to the inertia element 26 of the seismograph which, in turn, is carried on an arm 27 pivoted on a hinged suspension 28. The arm 27 is suspended by spring 29 which is secured to the screw 30. The vertical position of the arm 27 is adjusted by the knurled nut 31 cooperatively associated with the screw 30. The laminated member 11 of the displacement detecting device is shown secured to a lateral wall 32 of the seismograph frame 33. In operation the inertia element 26 of the seismograph is adjusted by means of the screw 30 and nut 31 until the windings 17 and 18 of the detecting device have their inductively coupled sides substantially medially positioned within their respective gaps 12 and 13. A final adjustment of the winding carrying member 16 is then made by means of the slot 24 and the adjustable securing means 25 until the resultant of the voltages induced in the windings 17 and 18 is zero. If now a seismic disturbance causes a relative displacement between the inertia element 26 and the frame 33, the windings 17 and 18 by reason of their securement through the cross piece 23 will perform a conjoint movement of a vibratory nature about their medial and non-detecting positions. A curve of the character depicted in Fig. 2 of the drawings will be delineated on the fluorescent screen of the cathode ray oscillograph and will have the envelope touching the time axis 34 at points 35'. These points represent the substantially medial positions of the detecting windings about which the vibration takes place and in which positions there is an annulment of the electromotive forces induced therein. The maxima in the envelope represent the resultant of the electromotive forces induced in the several windings when they are at their extreme positions of vibration. The amplitude of the wave 35 of the resultant of the induced electromotive forces which produces the envelope is directly proportional to the instantaneous position of the conjointly movable windings while the length along the horizontal time axis 34 between any two consecutive crests is a measure of the period of vibration. It should be carefully noted that the change in the resultant of the induced electromotive forces attending the detection of the displacement is double that produced by the same displacement of a single winding, in consequence of which the sensitivity of measurement is enhanced.

In Figs. 6 and 7 of the drawings there is shown a third embodiment of the invention in which a plurality of windings is mounted for conjoint movement within a single gap of a magnetic circuit. The magnetic circuit is shown as consisting of a laminated ferro-magnetic member 36 provided with a suitable gap 37. The winding 38 energized by any suitable source of alternating electromotive force of convenient frequency to insure the provision of a varying electromagnetic field within the member 36 and gap 37. As in all of the preceding embodiments the design of the magnetic circuit is such that a substantial part of the varying magnetic field within the gap 37 is uniform. Members 39 and 40 may be grooved peripherally to receive windings 41 and 42 respectively, these members being rigidly secured together in any convenient manner such as by bars 43 and 44 in conjunction with suitable securing means not shown. The sides 45 and 46 of the windings 41 and 42 respectively are closely adjacent and are substantially medially positioned within the uniform part of the electromagnetic field within the air gap 37. The windings 41 and 42 like those shown in Fig. 4 of the drawings are connected in series opposition and may be conveniently connected to a suitable indicating device, such as a cathode ray oscillograph, by means of the contacts 47 and 48.

The mode of operation of the device depicted in Fig. 6 of the drawings is similar to that in Fig. 4 in that the windings 41 and 42 are mounted for conjoint movement in response to any displacement to be detected. Since the sides 45 and 46 of the respective windings 41 and 42 have a non-detecting position substantially medially of the gap 37 and are mechanically secured together, any displacement from this initial position will increase the flux linkages with one of the windings while simultaneously decreasing the flux linkages with the remaining winding. The change, therefore, in the resultant of the induced electromotive forces will be double that produced by the same displacement of a single coil with the result that the sensitivity of detection is enhanced. A cathode ray oscillograph connected in circuit with the windings 41 and 42 will give a wave pattern similar to that depicted in Fig. 2 of the drawings.

The embodiment disclosed in Fig. 9 of the drawings is a slight modification of that depicted in Fig. 3 in that a compensating winding inductively coupled with the magnetic circuit is connected in series opposition with the movable winding so that the induced electromotive forces will annul each other in a predetermined position of the movable coil and thus give an oscillograph record similar to that of Fig. 2 when detecting a vibratory displacement but without enhanced sensitivity. In this embodiment the magnetic circuit is shown as consisting of a laminated member 49 provided with a gap 50 in which the inductively coupled side of the winding 51 carried by the member 52 is mounted for movement about a substantially medial position. An exciting coil 53 energized by an alternating source of electromotive force of convenient frequency insures the presence of a varying magnetic field within the member 49 and gap 50. The magnetic circuit is so designed that a substantial part of the varying electromagnetic field within the gap 50 has at any instant therein a substantially uniform flux distribution. The compensating winding 54 is shown inductively coupled with the magnetic circuit and is of such configuration and so connected with the winding 51 that in a predetermined position of the winding 51 within the air gap 50 the resultant of the induced electromotive forces will be zero. With the inductively coupled side of the winding 51 substantially medially positioned within the air gap 50, the turns of the compensating winding are taken as approximately half the turns in the winding 51. Under these circumstances, the resultant of the induced electromotive forces will be zero with the winding 51 in its medial and non-detecting position from which excursions are made attending the measurement or detection of a displacement. A suitable indicating device 55, such as, for example, a cathode ray oscillograph, is connected in circuit with the movable winding 51 and the compensating winding 54. The wave pattern obtained under vibratory detecting conditions will be similar to that depicted in Fig. 2 of the drawings but without enhancing sensitivity.

It is recognized in connection with the present invention that in addition to the electromotive forces induced in the detecting winding or windings by reason of the time rate of change of flux linkages attending the variation of the alternating magnetic field, that there will also be induced an electromotive force by reason of the velocity of motion of the winding itself with respect to the varying electromagnetic field. This additional electromotive force, which may be referred to as a parasitic electromotive force, will be superimposed upon the electromotive force induced by the varying electromagnetic field; but at low velocities it will be negligible and has therefore been ignored in the preceding description. Where the velocity is rapid the motion will necessarily be periodic and approximately sinusoidal in character for which a correction may be made in the calibration and adjustment of the device. For slow rates of movement of the winding or windings the existence of the parasitic electromotive force may be ignored. In general, the relative importance of the parasitic electromotive force will be reduced by an increase in the frequency of the varying electromagnetic field.

The device of my invention may be used for detecting displacements without being concerned with the measurement or the determination of the magnitude of the displacement. It goes without saying that measurement of a displacement necessarily includes detection of the displacement. Hence, in order to cover all aspects of the many uses of my device, the device will be referred to in the claims as a device for detecting displacement or equivalent language.

According to the provisions of the patent statutes I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A device for detecting displacements, comprising in combination a member provided with a gap, a primary winding associated with said member and a source of alternating electromotive force connected with said winding which on being energized thereby causes an alternating electromagnetic field to be set up in said member and gap, the field within said gap having at least a part thereof wherein at any instant there is a substantially uniform flux distribution, a plurality of conjointly movable secondary windings responsive to the displacement to be detected and connected in series opposition, each of said windings having a portion thereof in substantially non-inductive relation with the alternating electromagnetic field and the remaining portion thereof at all times in inductive relation with that part of the electromagnetic field within the aforesaid gap wherein at any instant there is a substantially uniform flux distribution, and means connected to said secondary windings and responsive to the resultant of the electromotive forces induced therein for indicating any detected displacement.

2. A device for detecting displacements, comprising in combination a member provided with a gap, a primary winding associated with said member and a source of alternating electromotive force connected with said winding which on being energized thereby causes an alternating electromagnetic field to be set up in said member and gap, the field within said gap having at least a part thereof wherein at any instant there is a substantially uniform flux distribution, a movable secondary winding responsive to the displacement to be detected and having a portion thereof in substantially non-inductive relation with the alternating electromagnetic field and the remaining portion thereof at all times in inductive relation with that part of the electromagnetic field within the aforesaid gap wherein at any instant there is a substantially uniform flux distribution, a stationary secondary winding in inductive relation with the alternating electromagnetic field set up in said member and connected in series opposition at all times with the aforesaid movable secondary winding, said stationary secondary winding having such a configuration that with the movable secondary winding in a predetermined position the resultant of the induced electromotive forces will be zero, and means connected to said secondary windings and responsive to the resultant of the electromotive forces induced therein for indicating any detected displacement.

EVERETT L. GAYHART.